Dec. 9, 1952 — D. L. HINGS — 2,621,287
NOISE NEUTRALIZING PULSE DETECTOR
Filed March 22, 1948 — 2 SHEETS—SHEET 1

INVENTOR.
DONALD L. HINGS
BY Woodling and Krost
attys

WITNESS

Patented Dec. 9, 1952

2,621,287

UNITED STATES PATENT OFFICE 2,621,287

NOISE NEUTRALIZING PULSE DETECTOR

Donald L. Hings, Vancouver, British Columbia, Canada

Application March 22, 1948, Serial No. 16,155

8 Claims. (Cl. 250—20)

My invention relates in general to pulsed or interrupted continuous wave reception systems and more particularly to such an I. C. W. system having both interrupted continuous waves and interference waves present therein.

An object of my invention is the provision of a reception system for obtaining an output voltage with an interrupted continuous wave input which effectively discriminates between the desired signal and interference energy of all forms.

Another object of my invention is the provision of utilizing the energy derived from a beat frequency between the desired signal wave and a second carrier wave to indicate the signal on a voltage responsive device.

Another object of the invention is the provision of a radio receiver utilizing a beat frequency obtained from the combination of a locally generated carrier and the signal wave having present therein interference waves wherein a signal output is obtained from a voltage responsive device with this signal output free from all interference energy.

Other objects and a fuller understanding may be had by referring to the following description and claims taken in conjunction with the accompanying drawings in which:

Figure 1:
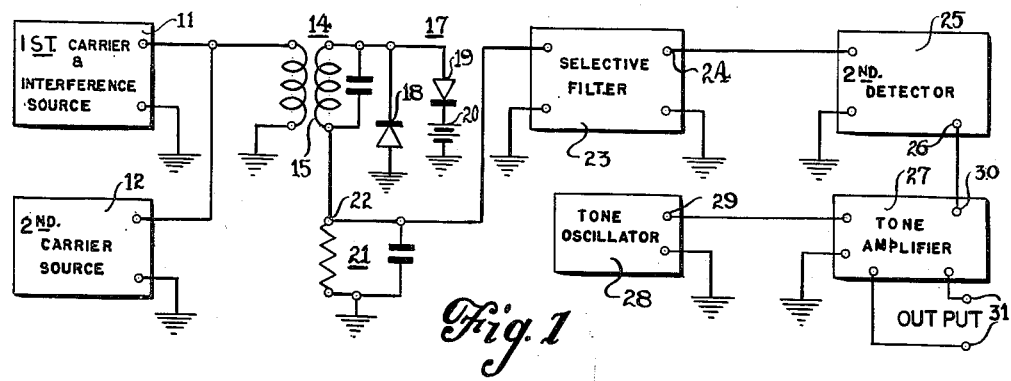
Figure 1 is a schematic diagram partially in block form showing the preferred embodiment of the invention.

This invention relates in general to an improved method of receiving interrupted continuous wave signals and is an improvement on my copending application which matured as Patent No. 2,532,450 on December 5, 1950, entitled "Pulse Reception System." In this application the term interrupted continuous wave shall be defined to mean a wave having a constant amplitude with on and off periods which is the interruption. The circuit in Figure 1 shows a first carrier and interference source 11 which may be any source such as an I. F. or R. F. transformer of a radio receiver and wherein the interference may be noise, static, or some adjacent channel interference. A second carrier source 12 is provided and is combined with the first carrier voltage 13 from the first carrier source 11 on a coupling transformer 14. This coupling transformer 14 has a secondary 15 for combining the first carrier waves 13 and the second carrier waves 16 and apply these combined waves upon a first detector circuit 17. In this preferred embodiment, the first detector circuit 17 preferably includes a first or normal rectifier 18 and a second or opposing rectifier 19. Also included in the first detector circuit 17 is a biasing means 20, which supplies a biasing voltage at a predetermined level. The first and second rectifiers 18 and 19 are connected in opposition relative to the voltage obtained from the secondary 15. The biasing means 20 is connected in series with the second rectifier 19 with this series combination in parallel with the first rectifier 18. A load 21 is provided to obtain a voltage from the first detector circuit 17. The upper end of the load 21 is connected to the lower end of the secondary 15 and the lower end of the load 21 is connected to ground in this preferred embodiment. The lower end of the parallel combination of the first and second rectifiers 18 and 19 is also connected to ground to complete the closed circuit. The upper terminal 22 of the load 21 supplies the detector load output voltage which is applied to a frequency selective filter 23. This frequency selective filter 23 is adapted to pass a given frequency and to have a high attenuation to all other frequencies. The output 24 of the frequency selective filter 23 is adapted to be applied in this preferred embodiment to a second detector 25. This second detector 25 utilizes the frequency passed by the selective filter 23 to obtain therefrom a control voltage in the form of a D. C. voltage. This control voltage appears at an output terminal 26 of this second detector 25 and is applied to control the amplification of the tone amplifier 27. A tone oscillator 28 is provided to generate a local tone or signal which preferably is an audio tone at an output terminal 29 and this audio tone is applied to the tone amplifier 27. The tone amplifier 27 is adapted to be controlled in its gain by the D. C. voltage applied at its control terminal 30. In this embodiment the tone oscillator 28 is arranged to have a substantially constant output at its output terminal 29 and under these conditions, the tone amplifier 27 is adapted to produce no output when no D. C. voltage is applied to the control terminal 30 and to produce an output voltage at the output terminals 31 when a D. C. voltage is present at the control terminal 30.

Figure 2:
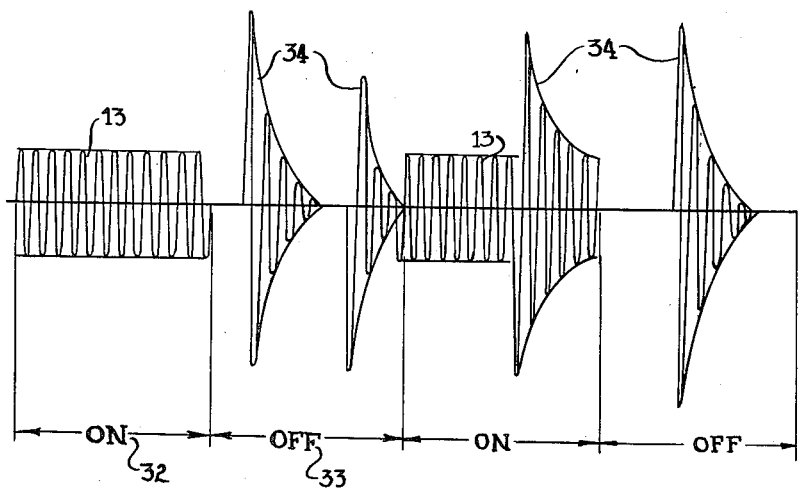
Figure 2 is a graph of the voltages obtained on the input to my circuit.
Figure 3:
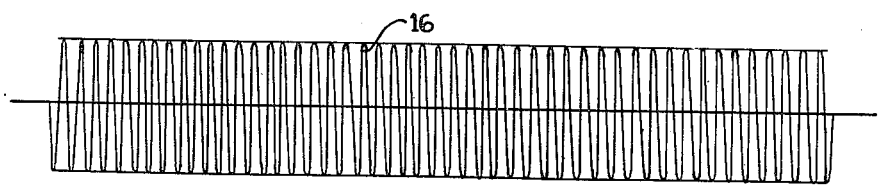
Figure 3 is a graph of the voltage wave obtained from the second carrier source.
Figure 4:
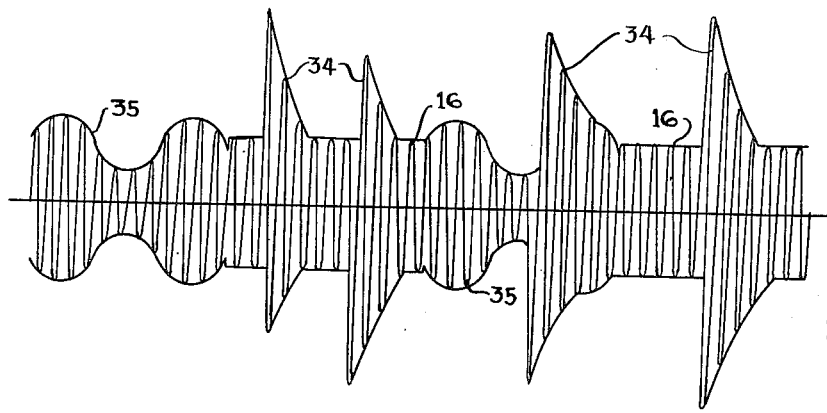
Figure 4 is a graph of the resultant wave obtainable from the combination of the voltage waves of Figures 2 and 3.

The operation of my circuit is best described by referring to the graph of the voltages shown in Figures 2 to 9 wherein the Figure 2 shows a graph of the first carrier wave 13 having an on period 32 and an off period 33 and having interference 34 present therein. The on and off periods 32 and 33 may be described as periods of voltage waves having an amplitude greater than and less than a predetermined level, respectively, namely, the level of the biasing voltage. This interference 34 may, as previously stated, be static or impulse noise of any kind or may be some adjacent channel interference. The graph of Figure 3 shows the second carrier wave 16 which is shown as having a substantially constant amplitude greater than the voltage of the biasing means 20. The mixture of these two wave forms of Figure 2 and Figure 3 is shown in the resultant wave form of Figure 4. The frequency of the second carrier wave is preferably made close to the frequency of the first carrier wave 13 such that a beat frequency 35 is produced within the audio spectrum. In Figure 4 this beat frequency 35 is shown as a modulation envelope during the on periods 32. During the off periods 33, the second carrier wave 16 continues as before with no beat frequency 35 present except in the event of an adjacent channel interference in which case the modulation envelope is at a frequency different from that produced during the on periods. The interference 34 will continue during both on and off periods.

Figure 5:
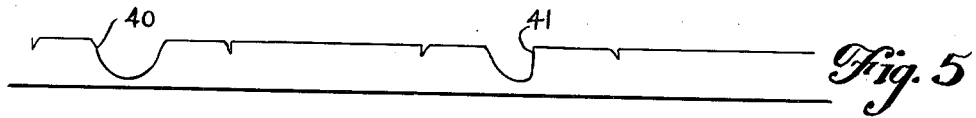
Figure 5 is a graph of the voltage obtained at the output of my detector system.

The action of the first detector circuit 17 is such as to produce a limiting action wherein the voltage passed by each of the first and second rectifiers 18 and 19, cancels or neutralizes for all voltages in excess of the level of the biasing means 20 thereby producing across the load 21 a voltage limited to the level of the biasing voltage of the biasing means 20. The first and second rectifiers 18 and 19, since they are connected in opposition, perform this neutralizing function to produce an output voltage 40 across the load 21 during the on periods 32 which will be of the wave form shown in Figure 5, namely a clipped voltage wave at the beat frequency. The Figure 5 shows a distorted portion 41 caused by the interference 34. During the off periods, the action of the first and second rectifiers 18 and 19 will produce a substantially constant D. C. voltage at the level of the biasing voltage of the biasing means 20. This results since the first detector circuit 17 permits free passage of half wave voltage pulses in one direction and a passage of the voltage pulses in the opposite direction which exceed the level of the biasing voltage to thus limit the amplitude of the voltage 40 appearing across the load 21 constantly to the level of the biasing voltage. Since the envelope of this second carrier is constantly above the level of the biasing voltage there will be nothing but a D. C. voltage appearing across the load 21 except in the case of an adjacent channel interference. Such an adjacent channel interference might produce a beat frequency within the audio spectrum such that a modulation envelope would appear during the off periods of the first carrier wave 13 which modulation envelope could or might have minimum points below the level of the biasing voltage. In this case, there would appear across the load 21 during the off periods a voltage at a frequency of this difference or beat frequency of the second carrier wave and such adjacent channel signal.

Figure 6:
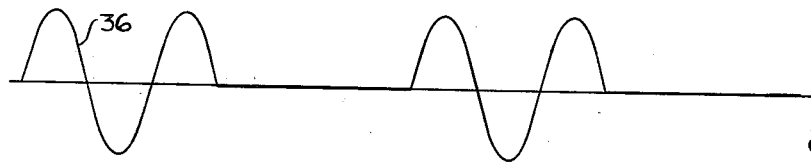
Figure 6 is a graph of the voltages obtained from the output of the selective filter.
Figure 7:
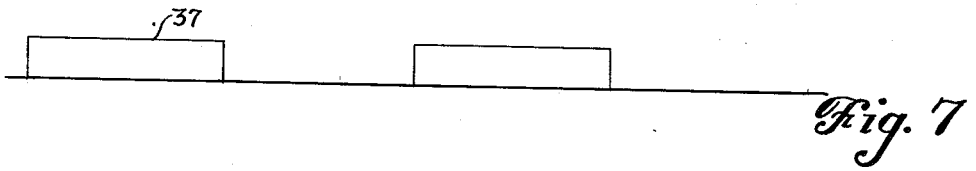
Figure 7 is a graph of the control voltage which may be obtained from my second detector output.
Figure 8:
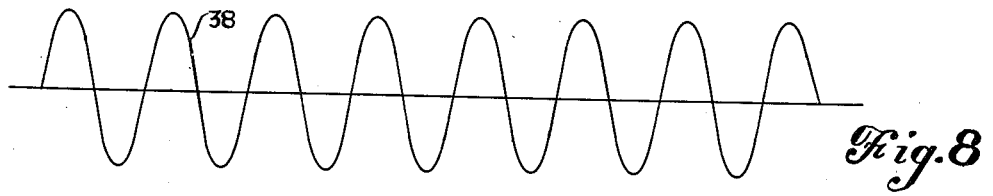
Figure 8 is a graph of the output voltage obtained from the local tone oscillator.
Figure 9:
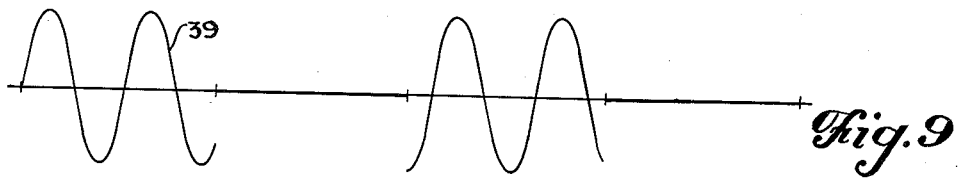
Figure 9 is a graph of the output voltage wave obtained from the tone amplifier.

The voltage 40 appearing on the load 21 is applied to the frequency selective filter 23 which removes by attenuation all frequencies other than the frequency to which it is tuned. The selective filter 23 in this preferred embodiment, is tuned to the frequency of the beat frequency 35. Thus any interference noise, including any beat frequencies caused by adjacent channels producing frequencies other than a frequency corresponding to the beat frequency 35, will be greatly attenuated and prevented from passing through the selective filter 23. The graph in Figure 6 shows the output 36 at the terminal 24 of the selective filter 23 with the clipped waves rounded out by the action of the reactive components of the filter and with the amplitude shown as increased. Preferably, in my circuit, I do increase the amplitude of this beat frequency 35, but such is not essential as the amplitude of the voltage obtained from the load 21 is of sufficient value. The output 36 of the selective filter 23 is next applied to a current or voltage responsive device to utilize this voltage in any suitable manner to indicate or differentiate between the on and off periods of the first carrier wave 13. In this preferred embodiment, I show this current responsive device as including the second detector 25, the tone oscillator 28 and the tone amplifier 27. The output voltage 36 of the selective filter 23 is preferably applied to the second detector 25 which obtains a D. C. control voltage 37 therefrom in any suitable manner such as by rectification and detection. This D. C. control voltage 37 may then be utilized to control the tone amplifier 27 and is preferably used to turn on the tone amplifier 27 to provide an output voltage at the output terminals 31. The output voltage 38 of the tone oscillator 28 is shown in the Figure 8 and preferably is some audio tone. This audio tone 38 is then applied to the tone amplifier 27 and is controlled in gain thereby. The D. C. control voltage 37 is adapted to turn on the tone amplifier 27 to produce an output voltage 39 at the output terminals 31 during the on periods 32. In a similar fashion, the absence of the D. C. control voltage 37 during the off periods 33 prevents the passage of the audio tone by the amplifier 27.

The use of the second detector 25, the tone oscillator 28 and the tone amplifier 27 provide an improved result in operation, since a pure audio tone is produced at the output terminals 31, which might not be possible of attainment at the output of the selective filter 23 under extremely adverse conditions of interference. Should any signal at the beat frequency get through the selective filter 23 during the off periods, it will be kept of low enough amplitude so that the second detector 25 does not supply sufficient control voltage to "trigger" the tone amplifier 27.

Although my invention has been described with a certain degree of particularity, it is understood that the present disclosure has been made only by way of example and that numerous changes in the details of construction and the combination and arrangement of parts may be resorted to without departing from the spirit

What is claimed is:

1. A radio circuit comprising, in combination, a first source of continuous waves having on and off periods and interference energy present therein, a second source of continuous waves, detector means including a first rectifier and an opposing rectifier operating on a common load, means for applying said first and second waves to said detector means, bias means connected to said opposing rectifier and poled to oppose current conduction through said opposing rectifier, said bias means being maintained at a level less than the envelope of said second continuous waves and greater than the difference in amplitudes between the first and second continuous waves such that during said off periods of said first continuous waves no alternating current output appears on said load, and during said on periods an alternating current output will appear across said load corresponding to hetrodyning of said first continuous wave with said second continuous wave and containing some of said interference energy, and a selective filter tuned to pass said heterodyne frequency and reject said interference energy.

2. A radio circuit comprising, in combination, a first source of continuous waves having on and of periods and interference energy present therein, a second source of continuous waves of different frequency than the frequency of said first source, detector means including a first rectifier and an opposing rectifier operating on a common load, means for applying said first and second waves to said detector means, bias means connected to said opposing rectifier and poled to oppose current conduction therethrough for biasing said opposing rectifier to thus allow signals above the level of said bias means to reduce the alternating current signal on the load obtained from said first rectifier to the said bias level, said bias means being maintained at a level just below the maximum amplitude of said second continuous wave such that during said off periods of said first continuous waves no alternating current output appears on said load, and during said on periods an alternating current output will appear across said load corresponding to heterodyning of said first continuous wave with said second continuous wave and containing some of said interference energy, and a selective filter tuned to pass said heterodyne frequency and reject said interference energy.

3. A radio circuit comprising, in combination, a first source of continuous waves having on and off periods and interference energy present therein, a second source of continuous waves of different frequency than the frequency of said first source, detector means including a first rectifier and an opposing rectifier operating on a common load, means for applying said first and second waves to said detector means, bias means connected to said opposing rectifier and poled to oppose current conduction therethrough for biasing said opposing rectifier to thus allow signals above the level of said bias means to reduce the alternating current signal on the load obtained from said first rectifier to the said bias level, said bias means being maintained at a level just below the maximum amplitude of said second continuous wave such that during said off periods of said first continuous wave no alternating current output appears on said load, and during said on periods an alternating current output will appear across said load corresponding to heterodyning of said first continuous wave with said second continuous wave and containing some of said interference energy, a selective filter tuned to pass said heterodyne frequency and reject said interference energy, a rectifier for utilizing said heterodyne frequency for obtaining a control voltage therefrom, and a current responsive device responsive to said control voltage for producing an output differentiating between said on and off periods of said first continuous wave.

4. Apparatus for demodulating a first radio wave having on and off periods, comprising means for mixing a second continuous radio wave with said first radio wave to produce a third wave bearing the beat frequency between the waves as modulation thereon during said on periods, said second radio wave having characteristics generally similar to said first radio wave, means for detecting one polarity of half wave pulses of said third wave, means for separately detecting the opposite polarity of half wave pulses of said third wave above a predetermined voltage level below the envelope of said second radio wave, and means for combining said detected pulses as an output.

5. Apparatus for demodulating a first radio wave having first and second periods with the amplitude during the first period greater than during the second period, comprising means for mixing a second continuous radio wave with said first radio wave to produce a third wave bearing the beat frequency between the waves as modulation thereon during said first periods, said second radio wave having characteristics generally similar to said first radio wave, means for detecting one polarity of half wave pulses of said third wave, means for separately detecting the opposite polarity of half wave pulses of said third wave above a predetermined voltage level below the envelope of said second radio wave, and means for combining said detected pulses whereby during the first periods the beat frequency wave will appear as an output and during said second periods the detected voltage pulses of said second wave will combine as an output to produce a voltage at a substantially constant amplitude determined by said predetermined voltage level.

6. Apparatus for demodulating a first radio wave having on and off periods and adapted to have interference energy present therein, comprising means for mixing a second continuous radio wave with said first radio wave to produce a third wave bearing the beat frequency between the waves as modulation thereon during said on periods, said second radio wave having characteristics generally similar to said first radio wave, means for detecting one polarity of half wave pulses of said third wave, means for separately detecting the opposite polarity of half wave pulses of said third wave above a predetermined voltage level below the envelope of said second radio wave, and means for combining said detected pulses whereby during the on periods the beat frequency wave will appear as an output and during said off periods the detected voltage pulses of said second wave will combine as an output to produce a voltage at a substantially constant amplitude determined by said predetermined voltage level thus preventing any of said interference energy from being present during said off periods.

7. Apparatus for demodulating a first radio wave having on and off periods and adapted to have interference energy present therein, comprising means for mixing a second continuous radio wave with said first radio wave to produce a third wave bearing the beat frequency between the waves as modulation thereon during said on periods, said second radio wave having characteristics generally similar to said first radio wave, means for detecting one polarity of half wave pulses of said third wave, means for separately detecting the opposite polarity of half wave pulses of said third wave above a predetermined voltage level below the envelope of said second radio wave, means for combining said detected pulses whereby during the on periods the beat frequency wave will appear as an output and during said off periods the detected voltage pulses of said second wave will combine as an output to produce a voltage at a substantially constant amplitude determined by said predetermined voltage level thus preventing any of said interference energy from being present during said off periods, and filter means for eliminating the second radio waves at said output during said off periods.

8. Apparatus for demodulating a first radio wave having on and off periods and adapted to have interference energy present therein, comprising means for mixing a second continuous radio wave with said first radio wave to produce a third wave bearing the beat frequency between the waves as modulation thereon during said on periods, means for detecting one polarity of half wave pulses of said third wave, means for detecting the opposite polarity of half wave pulses of said third wave above a predetermined voltage level below the envelope of said second radio wave, means for combining said detected pulses whereby during the on periods the beat frequency wave will appear as an output and during said off periods the detected voltage pulses of said second wave will combine as an output to produce a voltage at a substantially constant amplitude determined by said predetermined voltage level thus preventing any of said interference energy from being present during said off periods, filter means for eliminating the second radio waves at said output during said off periods, and means for selectively passing the energy of said beat frequency wave obtained from the output to a utilization device during said on period while selectively rejecting said interference energy.

DONALD L. HINGS.

REFERENCES CITED

The following references are of record in the file of this patent:

UNITED STATES PATENTS

| Number | Name | Date |
| --- | --- | --- |
| 1,723,440 | Ranger | Aug. 6, 1929 |
| 1,727,813 | David | Sept. 10, 1929 |
| 2,087,063 | McCutchen | July 13, 1937 |
| 2,099,311 | Nicholson, Jr. | Mar. 16, 1937 |
| 2,153,969 | McCutchen et al. | Apr. 11, 1939 |
| 2,179,966 | Sturley | Nov. 14, 1939 |
| 2,279,275 | Kanenarovic | Apr. 7, 1942 |
| 2,283,404 | Wood | May 19, 1942 |
| 2,363,288 | Bell | Nov. 21, 1944 |
| 2,532,450 | Hings | Dec. 5, 1950 |